March 5, 1968  J. W. DANIELS  3,371,944
VARIABLE AXIS CENTER WHEEL
Filed April 8, 1966  3 Sheets-Sheet 1

INVENTOR.
J. WILEY DANIELS,
BY
Linton and Linton
ATTORNEYS.

March 5, 1968 — J. W. DANIELS — 3,371,944
VARIABLE AXIS CENTER WHEEL
Filed April 8, 1966 — 3 Sheets-Sheet 2
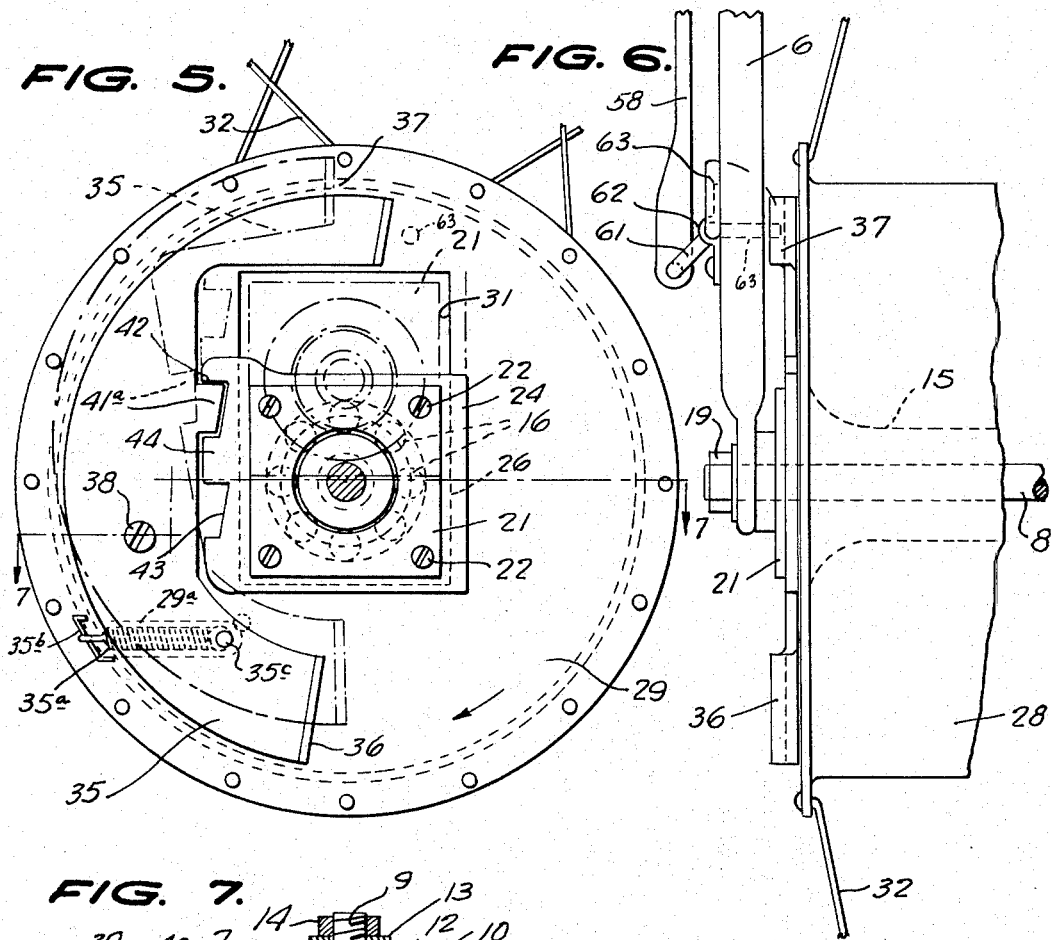
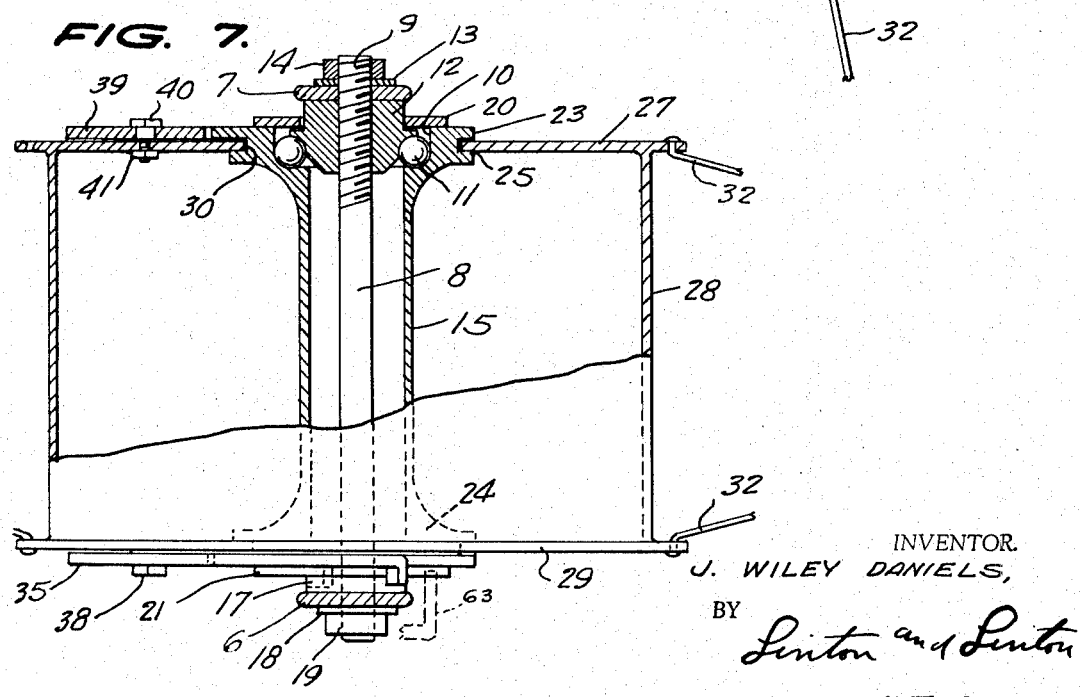
INVENTOR.
J. WILEY DANIELS,
BY
Linton and Linton
ATTORNEYS.

March 5, 1968  J. W. DANIELS  3,371,944
VARIABLE AXIS CENTER WHEEL

Filed April 8, 1966  3 Sheets-Sheet 3

INVENTOR.
J. WILEY DANIELS,
BY Linton and Linton
ATTORNEYS.

United States Patent Office 3,371,944
Patented Mar. 5, 1968

3,371,944
VARIABLE AXIS CENTER WHEEL
James W. Daniels, Rte. 3, Box 200W,
Tallahassee, Fla. 32301
Filed Apr. 8, 1966, Ser. No. 541,208
8 Claims. (Cl. 280—229)

The present invention is concerned with a variable axis center wheel having an axle whose position relative to the axis of the wheel can be varied as desired, while in motion.

The principal object of the present invention is to provide a wheel having a center hub with an axle extending through said hub and which axle can be quickly and easily positioned either on the axis of said hub or off-centered relative to said hub axis for providing the wheel with either a normal true rotation around said axle or with an off-centered rotation around said axle to provide the vehicle supported by said wheel with a loping or sinuous movement over the surface upon which the wheel is being rolled.

A further and important object of the present invention is to provide at least one wheel for bicycles, tricycles, scooters and other vehicles which wheel has a hub, an axle extending through said hub and locking means for retaining said axle either on the axis of the hub or to one side of said hub axis and which locking means can be released from time to time by an operator of the vehicle while in motion for changing the position of the axle relative to said hub causing the vehicle to either move in its normal manner, that is with the wheel concentric with the axle or with the wheel off-centered relative to said axle giving the vehicle a loping or undulating movement relative to the surface upon which the vehicle is being moved.

Another important object of the present invention is to provide a mechanism for connecting a vehicle wheel axle to the hub thereof and which mechanism is releasable by an operator of the vehicle through a system of levers or otherwise carried by said vehicle for permitting the axle to change its position relative to the hub under the weight of the vehicle and load and which mechanism will automatically relock itself for retaining the axle and hub in the new position assumed thereby.

Further objects of the invention will be in part pointed out and in part obvious from the following description of the accompanying drawings in which;

FIG. 5 is an enlarged side view of the present axle hub and locking mechanism therefor with the variable positioning of the elements indicated by dotted lines.

FIG. 6 is also an enlarged partial side view of the hub, axle, locking mechanism, and release therefore with the axle attached to the end portion of a vehicle fork.

FIG. 7 is an enlarged top view of the hub and axle partly in a cross-section taken on line 7—7 of FIG. 5.

Figure 1:
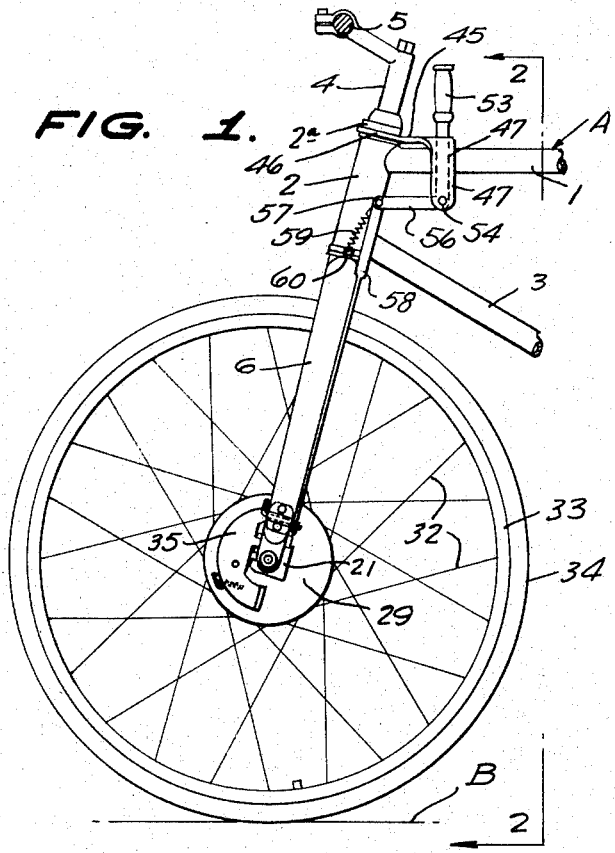
FIG. 1 is a side elevation of the front end portion of a bicycle with the present invention connected thereto.
Figure 2:
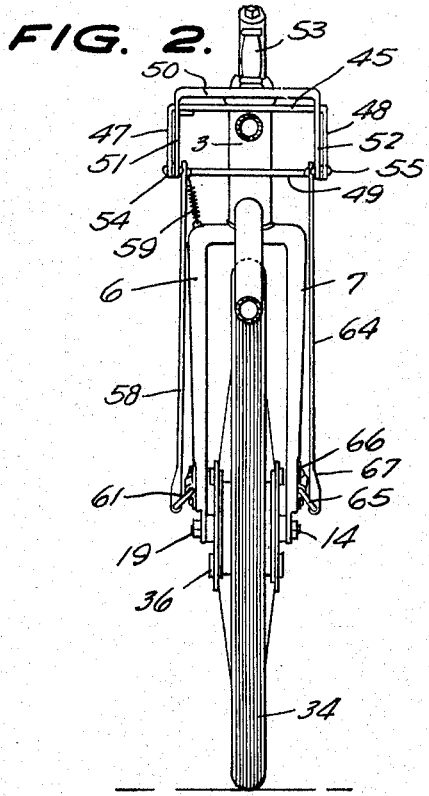
FIG. 2 is a cross-sectional view taken on line 2—2 of FIG. 1.
Figure 3:
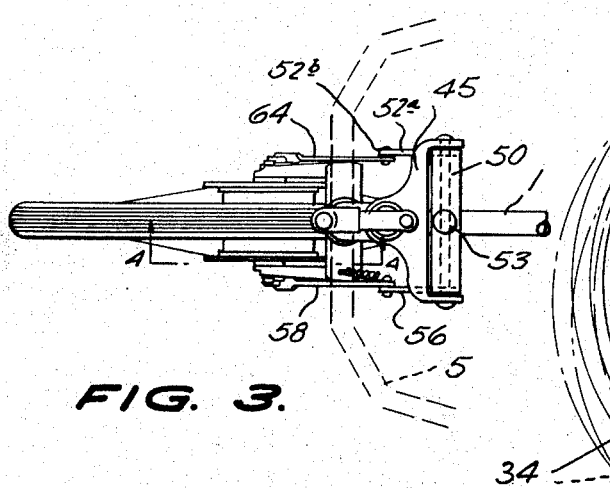
FIG. 3 is a top view of the front end portion of the bicycle of FIG. 1.

Referring now more particularly to the drawings, wherein like and corresponding parts are indicated by similar reference characters, FIGS. 1–3 inclusive show a wheel and release mechanism in accordance with the present invention as mounted uponn the front or steering end of a bicycle generally indicated by A. However, it is to be appreciated that said wheel and release mechanism can equally as well be mounted on the rear wheel or one or more than one of the wheels of a bicycle, tricycle, scooter or other wheels vehicle or as the single wheel of a unicycle, for example.

Thus the present invention is shown by way of an example only as the front wheel of a bicycle and the term "vehicle" as used hereinafter is meant to indicate various wheeled vehicles to which such a wheel can be attached.

Said bicycle A has the conventional frame with the top rod 1, slanting brace rod 3 and a hub 2 fixedly connected to both said rods and extending across the ends thereof. A steering rod 4 rotatably extends through hub 2 and has a handle bar 5 attached thereto and is joined to a U-shaped fork having side legs 6 and 7. Nut 2a retains said steering rod relative to said hub in a conventional manner.

An axle 8 has oppositely threaded ends 9. An inner race 10 has a series of ball bearings 11 positioned therearound and said inner race has a tubular body 12 through which one end of axle 8 extends. Fork leg 7 and a washer 13 both have an opening through which an end of axle 8 extends while a nut 14 is in threaded engagement with said one end of axle 8 for retaining these elements on said axle.

A tubular axle housing 15 is recessed at its opposite ends providing outer raceways for the ball bearings 11 at one end and ball bearings 16 on its opposite end. Said ball bearings 16 are also positioned around the inner raceway 17 through which axle 8 extends while the other fork leg 6 also has axle 8 extending therethrough as does a washer 18 and a nut 19 is in threaded engagement with the opposite end of axle 8 retaining elements 17, 6, and 18 together as shown in FIG. 7 on axle 8.

A pair of plates 20 and 21 are detachably attached to the opposite end of said axle housing by screws 22, only one set of which are shown in FIG. 5 and said plates have the inner races 12 and 17 extending therethrough respectively.

Axle housing 15 has lateral end flanges 23 and 24 at the opposite ends thereof with flange 23 having straight recesses 25 in the opposite sides thereof while flange 24 has straight recesses 26 in its opposite sides.

Figure 8:
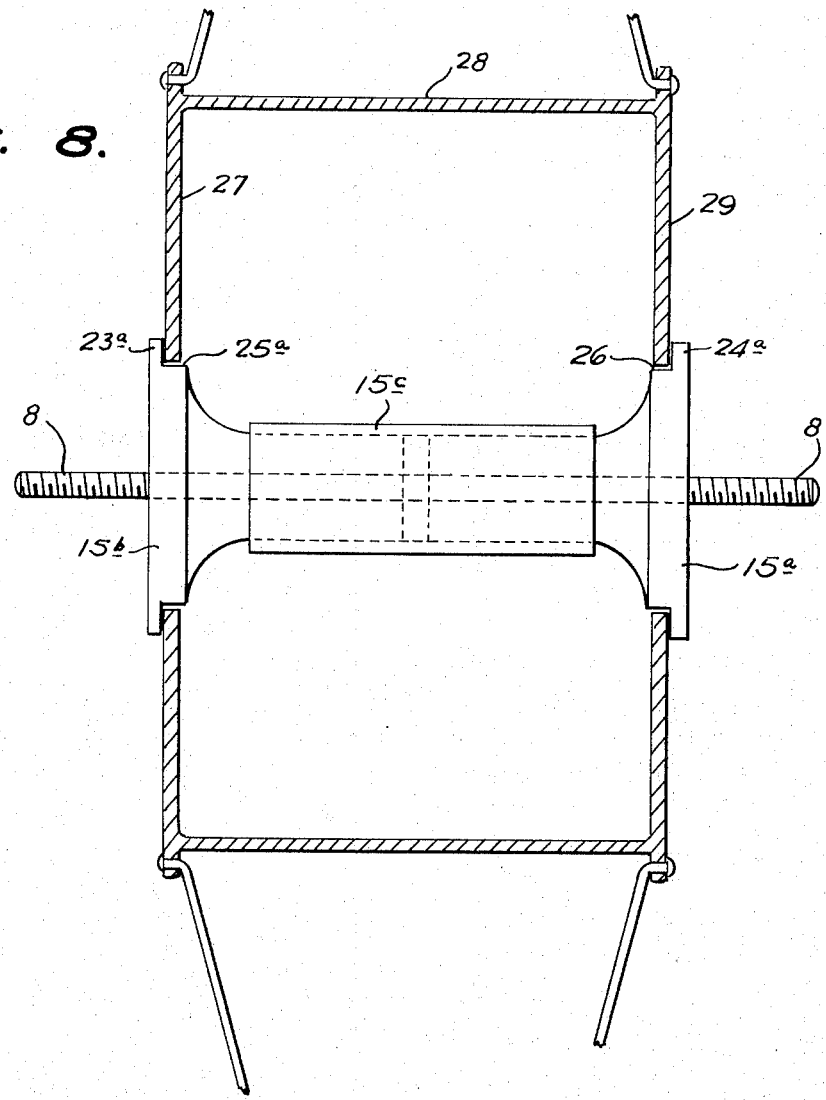
FIG. 8 is a cross-sectional view of a modified form axle housing.

FIG. 8 of the drawings shows a modified form of the tubular axle housing. Said modified housing has two similar halves, that is, right side half 15a and left side half 15b whose adjacent ends face one another but are spaced apart while a sleeve 15c has said housing end portions slideably inserted therein. The right hand housing portion 15a has a flange 24a with a straight side recess 26 and left hand housing portion 15b has flange 23a with a straight side recess 25a. Hub side walls 27 and 29 have left housing half portion 15b and right housing half portion 15a extending therethrough respectively. Said modified axle housing 15a–15c is otherwise similar to tubular axle housing 15 but with the two housing portions being slideable in sleeve 15c it is possible to adjust said axle housing half portions in relation to the hub side walls 27 and 29.

An annular hub has straight parallel spaced-apart sides 27 and 29 joined together by a fixed hub 28 extending therebetween. Hub side wall 27 has a rectangular opening 30 therethrough while side wall 29 has a rectangular opening 31 therethrough opposite opening 30. Spokes 32 are attached to said hub side walls 27 and 29. and extend therefrom to a rim 33 to which they are connected and which rim has a tire 34 either of the solid or pneumatic type mounted therearound.

A semi-circular locking trip plate 35 has a lateral end flange 36 at one end thereof and a similar lateral flange 37 at the opposite end thereof. Said locking trip plate is pivotally connected by a nut and bolt 38 to side wall 29.

A second semi-circular locking trip plate 39 which is similar to locking trip plate 35 is pivotally mounted to hub side wall 27 by bolt 40 and retained by nut 41. Said locking trip plates 35 and 39 both have an inwardly extending tooth such as tooth 41a as shown for locking trip plate 35 in FIG. 5.

Locking plate 24 has a pair of side slots 42 and 43 separated by a tooth 44 thereof and which slots 42 and 43 are each capable of receiving tooth 41a therein. Locking plate 23 likewise has similar recesses and a tooth (not shown) but which are the same as slots 42 and 43 and tooth 44 of locking plate 24.

A coil spring 35a is fastened at one end to a hook 35b fixedly attached to side wall 29 and at its opposite ends by a rivet 35c to locking trip plate 35. Locking trip plate 39 is likewise resiliently attached to hub side wall 27 by elements (not shown) similar to elements 35a, 35b, and 35c.

A plate 45 has a ring shaped end 46 positioned between hub 2 and locking nut 2a with steering rod 4 extending therethrough. Said plate 45 has a U-shaped opposite end configuration with legs 47 and 48. A threaded end rod 49 extends between and through said legs 47 and 48. A second U-shaped lever 50 has side legs 51 and 52 with rod 49 extending therethrough and a top handle 53. Nuts 54 and 55 are in threaded engagement with the opposite ends of rod 49 for retaining said rod through legs 47 and 48 with legs 51 and 52 pivotally mounted on said rod. Leg 51 has a lateral extension 56 which is pivotally connected by rivet 57 to a link 58 while a coil spring 59 is attached by screw 60 to hub 2 at one end and to rivet 57 at its other end tending to move link 58 downwardly. Link 58 at its lower end has a leg 61 of a trip pin pivotally extending therethrough while a bearing 62 attached to fork leg 6 has an intermediate portion of said trip pin pivotally extending therethrough with leg 63 of said trip pin normally extending in line with fork leg 6 but capable of being pivoted along the side of said fork leg for being struck by end flange 36 or 37 as indicated in dotted lines in FIG. 6.

Leg 52 has a lateral extension 52a pivotally connected by rivet 52b to a link 64. One leg 65 of a second trip pin pivotally extends through the lower end of link 64 while a second bearing 66 is attached to fork leg 7 and has an intermediate portion of said second trip pin pivotally extending therethrough. The other leg 67 of said second trip pin also normally extends along fork leg 7 but is capable of being pivoted in front of the lateral flanges (not shown) of locking trip plate 39 corresponding to end flanges 36 and 37 of locking trip plate 35.

While two sets of trip pins operated by links 58 and 64 are shown and described as well as two sets of locking trips 35 and 39, both sets of which may be desirable for the purpose of strength and accurate operation of the axle, it is to be appreciated that only one set of these elements may be necessary in some instances.

In the use of the present wheel when attached to a vehicle such as a bicycle for example, the weight of the bicycle and the rider through the connection of the fork legs 6 and 7 to the axle 8 will tend to move the locking plates 23 and 24 to one end of the openings 30 and 31 respectively when the locking trip teeth 41a are disengaged from the locking plate slots 42 and 43. However, springs 35a which are positioned partially within slots 29a of both the side walls 27 and 29 will tend to pivot the locking trip plates 35 and 39 so that their teeth 41a will move into or be retained in one of the side slots 42 and 43 retaining axle housing 15 either extending on the axis of said hub or off centered relative thereto as indicated in dotted lines in FIG. 5. Thus if teeth 41a are in locking plate slots 42, the hub will be positioned as shown in full lines of FIG. 5 with the axle extending on the axis of the wheel. If the teeth 41a, on the other hand, are moved into or positioned in the locking plate slot 43, the axle will be off-centered relative to the axis of the wheel as shown in FIG. 5 in dotted lines.

With the bicycle being ridden, the rider can pull back on handle 53 pivoting the extensions 56 and 52a and connected links 58 and 64 respectively upwardly causing the trip pins to pivot moving the trip pin legs 63 and 67 into the path of their respective locking trip flanges 36 or 37. Thus if the axle is positioned as shown in full lines in FIGS. 5 and 6, the legs 63 and 67 will be in the path of the flanges 37, only, causing the locking trip plate to be pivoted as shown, for example in dotted lines in FIG. 5, disengaged teeth 41a from locking plate slots 42 and upon the continuing of the rotation of the wheel through a half revolution so that the hub is at the top of the openings 30 and 31 the weight of the bicycle and the rider on the axle will cause said hub to slide in said openings 30 and 31 or to the off-centered position. As soon as teeth 41 move opposite slots 43, springs 35a will pivot the locking trip inserting the teeth 41a in locking plate side slots 43 retaining the axle off-centered relative to the hub. The rider thus merely pulls back on handle 53 and promptly releases the same whereupon spring 59 will pull the links 58 and 64 downwardly returning legs 63 and 67 to their normal vertical position out of the path of the flanges.

When it is desired to return the axle to its centered position on the axis of said hub, the rider again pulls on lever 53 moving legs 64 and 67 into the path of the flanges 36, only, due to the hub having moved to the position as indicated in dotted lines in FIG. 5, namely its off-centered position. The legs 63 and 67 will then engage the flanges 36, only, pivoting locking trip plates 35 and 39 disengaging teeth 41a from the locking plate slots 43. Again as soon as the wheel makes a half revolution the weight of the rider and bicycle on the axle causes the axle to slide in openings 30 and 31 to its centered position as shown in full lines in FIG. 5. Thus teeth 41a are again opposite locking plate slots 42 and springs 35 will pivot the locking trip inserting the teeth 41a into said slot 42 retaining the axle centered on the axis of the hub.

Figure 4:
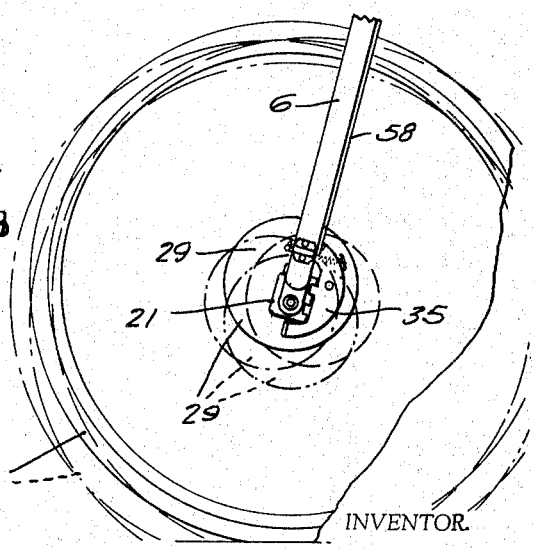
FIG. 4 is a sectional view taken on line 4—4 of FIG. 3, but showing the wheel off-centered relative to the axle thereof and with the resulting path of rotation of the wheel indicated in dotted lines.

The rider can thus quickly and easily change the rotation of the wheel from a centered position whereby the bicycle will ride in its normal level position relative to the surface B upon which it is traveling or he may off center the axle relative to the hub and wheel axis as shown in FIG. 4 so that the tire 34 will turn as shown in dotted lines in FIG. 4, giving the bicycle a loping or undulating ride. Thus the rider can change the type of ride of the bicycle as he desires from time to time.

While lever 53 is shown as operating the change centered mechanism for the front or steering wheel of a bicycle it can equally as well be used for changing the rear wheel of the bicycle if such a change center mechanism is incorporated therein or separate handles 53 can be readily used for changing the front or back wheel of the bicycle having such a change centered mechanism. Also vehicles having more than one or two wheels such as a tricycle or a wagon or the like can have a change center mechanism of the present type incorporated in one or more wheels thereof for changing the ride characteristics of the vehicle or other methods of change may be incorporated.

The vehicle can be moved either forwardly or backwardly without being effected by the present change center mechanism, but generally the handle 53 is only operated when the vehicle is moving in a forward direction such as towards the left of FIG. 1.

The present invention is capable of considerable modification, and such changes thereto as come within the scope of the appended claims is deemed to be a part thereof.

I claim:

1. A variable axis center wheel comprising a wheel rim, an axle, a tubular axle housing rotatably supported on and having said axle extending therethrough, a hub having a pair of spaced apart side walls, means connecting said hub to said wheel rim, both of said hub side walls having a straight edged opening therethrough, said axle housing having straight recesses in both ends thereof with said hub side wall edges slideably positioned therein, a locking trip plate pivotally mounted on one of said hub side walls and having a tooth, said axle housing having side slots each capable of receiving said locking trip tooth therein for retaining said axle housing at a given position relative to said hub, said locking trip plate having a pair of lateral flanges, operable means capable of engaging one of said locking trip plate flanges as desired to pivot said locking trip plate disengaging said tooth from one of said axle housing side slots at a time and resilient means tending to retain said tooth in one of said axle housing side slots at a time.

2. A variable axis center wheel as claimed in claim 1 wherein both of said hub side walls have a straight edged opening therethrough, said axle housing has straight recess in the other end thereof with said hub second mentioned side wall edges slideably positioned therein, a second locking trip plate is pivotally mounted on the other of said hub side walls and has a tooth, said axle housing has a second set of side slots each capable of receiving said second locking trip plate tooth therein, said second locking trip plate has a pair of lateral flanges, said manually operable means also is capable of engaging said second locking trip plate flanges for disengaging said second tooth from said axle second sets of slots at a time and resilient means tends to retain said second tooth in one of said axle second set of slots at a time.

3. A variable axis center wheel as claimed in claim 1 wherein said manually operable means consists of a lock trip having a pair of legs connected by a pivotally mounted intermediate portion, a pivotally mounted handle, linkage operatively connecting said handle to one of said pair of legs, the other of said pair of legs being capable of engaging one of said locking trip plate flanges at a time and resilient means tending to retain said other leg from engaging said locking trip plate flanges.

4. A variable axis center wheel as claimed in claim 1 wherein said resilient means consists of a spring connected to said hub and said locking trip plate.

5. A variable axis center wheel as claimed in claim 1 including a vehicle, means connecting said axle to said vehicle, and said manually operable means being mounted on said vehicle.

6. A variable axis center wheel as claimed in claim 1 including a vehicle having a leg connected to said axle, and said manually operable means including a trip pin having a pair of legs connected by an intermediate portion pivotally mounted on said vehicle leg with one of said pair of legs capable of at times engaging one of said locking trip plate flanges, a link pivotally connected to the other of said lock trip legs, a handle pivotally connected to said vehicle and having a lateral extension, said link being pivotally connected to said handle extension and resilient means connected to said vehicle and said handle extension tending to retain said link with said one of said pair of legs out of engagement with said locking trip plate flanges.

7. A variable axis center wheel as claimed in claim 1 including a vehicle, means connected with said axle, axle housing and locking trip plate allowing change of position of axle, or wheel axis center by operator or otherwise while vehicle is in motion.

8. A variable axis center wheel as claimed in claim 1 wherein said tubular axle housing includes a pair of spaced apart end portions and a sleeve having said end portion extending therein each from an opposite end of said sleeve.

References Cited
UNITED STATES PATENTS

| | | | |
|---|---|---|---|
| 605,182 | 6/1898 | Johnston | 280—229 |
| 883,746 | 4/1908 | Robbins | 280—229 |
| 2,125,568 | 8/1938 | Huyssen et al. | 280—229 |

KENNETH H. BETTS, *Primary Examiner.*